(12) United States Patent
Li

(10) Patent No.: US 6,901,437 B1
(45) Date of Patent: May 31, 2005

(54) MOBILE CACHE FOR DYNAMICALLY COMPOSING USER-SPECIFIC INFORMATION

(75) Inventor: Benjamin Bin Li, Concord, MA (US)

(73) Assignee: Verizon Laboratories Inc., Waltham, MA (US)

(*) Notice: Subject to any disclaimer, the term of this patent is extended or adjusted under 35 U.S.C. 154(b) by 525 days.

(21) Appl. No.: 09/684,047

(22) Filed: Oct. 6, 2000

(51) Int. Cl.[7] ............................................. G06F 15/16
(52) U.S. Cl. ...................... 709/219; 709/217; 709/218; 707/10
(58) Field of Search ................................ 709/202–206, 709/216–219, 246, 227, 228; 707/10

(56) References Cited

U.S. PATENT DOCUMENTS

| | | | | |
|---|---|---|---|---|
| 5,978,828 A | * | 11/1999 | Greer et al. ................. | 709/224 |
| 6,061,678 A | * | 5/2000 | Klein et al. ..................... | 707/3 |
| 6,219,676 B1 | * | 4/2001 | Reiner ......................... | 707/201 |
| 6,298,356 B1 | * | 10/2001 | Jawahar et al. ............. | 707/201 |
| 6,421,733 B1 | * | 7/2002 | Tso et al. .................... | 709/246 |
| 6,473,609 B1 | * | 10/2002 | Schwartz et al. ........... | 455/406 |
| 6,526,580 B2 | * | 2/2003 | Shimomura et al. .......... | 725/63 |
| 2001/0020242 A1 | * | 9/2001 | Gupta et al. ............. | 707/501.1 |
| 2001/0051927 A1 | * | 12/2001 | London et al. ................ | 705/51 |
| 2001/0054087 A1 | * | 12/2001 | Flom et al. .................. | 709/218 |
| 2002/0052824 A1 | * | 5/2002 | Mahanti et al. ............... | 705/37 |
| 2002/0054090 A1 | * | 5/2002 | Silva et al. .................. | 345/747 |
| 2002/0112014 A1 | * | 8/2002 | Bennett et al. ............. | 709/206 |

* cited by examiner

*Primary Examiner*—Dung C. Dinh
*Assistant Examiner*—Yasin Barqadle
(74) *Attorney, Agent, or Firm*—Leonard C. Suchtya, Esq.; Joel Wall, Esq.; Rader, Fishman & Grauer PLLC

(57) ABSTRACT

A system and method for caching data in wireless application protocol (WAP) enabled services caches static data and facilitates dynamic creation of user-specific information to provide a customized output. The mobile cache generates the user-specific information in WML in real-time from cached information according to user-specified preferences. A change trigger triggers information delivery after a predetermined amount of cached information changes. The system may also include an image converter to ensure that image objects can be viewed easily on WAP-enabled devices having small display screens and a document converter to dynamically compose information from selected data based on XML-based content tagging.

15 Claims, 1 Drawing Sheet

MOBILE CACHE FOR DYNAMICALLY COMPOSING USER-SPECIFIC INFORMATION

TECHNICAL FIELD

The present invention relates to caching, and more particularly to a cache that handles both static and dynamic data.

BACKGROUND OF THE INVENTION

Wireless Application Protocol ("WAP") enabled services are currently becoming more popular as more users incorporate wireless devices into their daily lives. As is known in the art, WAP is a standardized way for wireless devices (e.g. portable phones, hand-held devices) to communicate with each other and to access the Internet.

Caches are widely used in many applications to improve processing speed by providing a location for temporary data storage. For example, the cache can store recently accessed Web pages so that, when the user later returns to the Web page, the browser obtains the Web page information locally from the cache rather than from the origin server. The information from the cache reaches the user faster and also relieves the network from the burden of the additional traffic that would have occurred if the Web page information had to be re-transmitted to the wireless device.

Currently known-caching schemes in wireless applications, however, can deal only with static data and cannot generate any information according to user-specified parameters. As a result, there are no known ways of providing personalized information delivery with existing cache systems.

There is a need for a cache system that is not limited to handling static data and that can handle and generate dynamic user-specific information.

SUMMARY OF THE INVENTION

Accordingly, the present invention is directed to a mobile cache system and method for Wireless Application Protocol ("WAP") enabled services. The inventive mobile cache system not only can cache static data, but also can share processing functions with origin Web servers and facilitate dynamic creation of user-specific information.

A mobile cache server according to the invention obtains a user profile, which contains preference data with respect to output content and layout, looks for user-requested information in an object database, fetches and caches the information from an origin server if the information is not already in the object database, and composes user-specific information according to the preference data.

As a result, the inventive system and method caches static data like known caches but also shares data processing functions with origin Web servers and allows dynamic creation of user-customized information. By dynamically generating information as well as caching static pages, the invention reduces traffic burden on the original server while providing users with personalized, user-specified information service.

DETAILED DESCRIPTION OF THE PREFERRED EMBODIMENT

Figure 1:
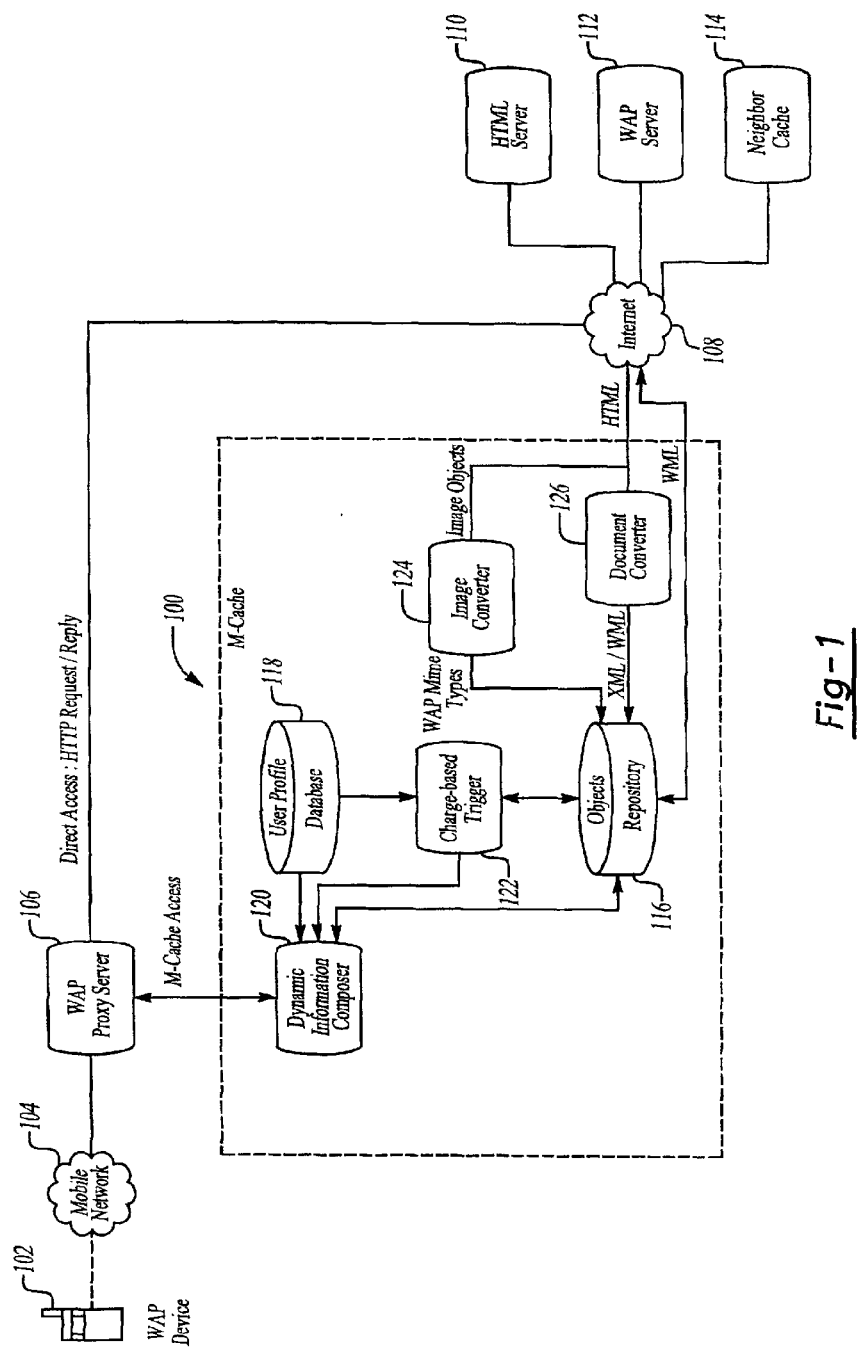
FIG. 1 is a schematic diagram of a mobile cache system architecture incorporating one embodiment of the present invention.

FIG. 1 is a representative diagram of a mobile cache system architecture incorporating the mobile cache of the present invention. As indicated in the FIGURE, the mobile cache 100 is particularly suited to a system using Wireless Application Protocol ("WAP") enabled services and is designed to improve the experience of wireless device (e.g. wireless phones, hand-held devices) users during Internet access. As can be seen in the FIGURE, a wireless device 102 couples to the mobile cache 100 via a mobile network 104 connected to a WAP proxy server 106. The WAP proxy server 106 is connected to the mobile cache 100 and directly to the Internet 108, which include Hypertext Markup Language ("HTML") servers 110, WAP servers 112, and/or neighbor caches 114. The term "origin server" will be used in this application to refer to any location from which the mobile cache 100 obtains its original data, such as the Internet 108.

The mobile cache 100 itself preferably includes an object repository or database 116 that caches selected data from the origin server, such as recently accessed Web pages. The mobile cache 100 also includes a user profile database 118 and a dynamic information composer 120. The user profile database 118 stores one or more user profiles that contain output preference data. The output preference data may include data specifying the content and layout of the information fetched from the object database 116 when it is delivered to the user via the wireless device 102. When the mobile cache 100 receives a user request for specific information from the Internet 108, it first looks to the user profile database 118 to obtain the user profile associated with the user making the request. If the user's profile is not available in the database 118, the mobile cache 110 may either display the fetched information using standardized content and formatting or request additional information from the user to generate a new user profile to be stored in the user profile database 118.

Once the mobile cache 100 receives a user request and obtains the user profile from the user profile database 118, the mobile cache server looks for the requested information in the object database 116. If all of the requested information is located in the object database 116, the dynamic information composer 120 uses the requested information to compose user-specific information according to the user's preferences with respect to content and layout. The information is preferably composed in Wireless Markup Language ("WML") in real time. The user-specific information is then outputted to the wireless device 102 for the user's consideration.

If the object database does not contain all of the requested information and if the missing information is not available in local or neighbor caches, the mobile cache 100 will declare a cache miss and pass the user request to the origin server so that the information can be fetched from the origin server (e.g., the Internet 108) and then stored in the object database 116. The dynamic information composer 120 then composes the user-specific information in the manner explained above, according to the user's preferences with respect to content and layout specified in the user profile. As the dynamic information composer 120 generates the user-specific information and caches static pages, the mobile cache 100 may locally maintain logs that can be appended to log files of origin servers.

As can be seen in FIG. 1, the mobile cache 100 may also include a change-based trigger 122 that monitors information changes in the object database 116 and triggers information delivery, according to user preferences, when the amount of changed information reaches a predetermined threshold. This monitoring and triggering preferably occurs even while the dynamic information composer 120 is composing user-specific information.

The mobile cache 100 according to the present invention also may include an image converter 124 and/or a document converter 126. The image converter 124 can be used alone if the mobile cache 100 is constructed to function in its simplest mode. Caching image objects improves performance by saving a great deal of network bandwidth. Because the small screens in wireless devices, such as phones and hand-held devices, have difficulty rendering the image objects that are often attached to HTML files, the image converter 124 converts the image objects so that they can be viewed by WAP-enabled devices before they are cached into the object database 116.

The document converter 126 can be included to create an advanced operating mode for the mobile cache 100 by being able to extract data segments from single or multiple Web pages to provide further dynamic information composition capability. The document converter 126 takes advantage of XML-based content tagging by converting the HTML files obtained from the origin server into Extensible Markup Language ("XML") files and storing them in the object database. The XML files, including their content-based tags, can then be queried by the mobile cache server based on the user's information request so that selected data segments from the XML files can be used to dynamically compose the user-specific information. By taking advantage of the XML-based content tags, the mobile cache 100 can customize the user-specific data at an additional level of detail. Of course, if the data from the origin server is already a WML file, the WML file can be transmitted directly for storage in the object database 116 without first passing through the image converter 124 or the document converter 126.

Thus, the inventive mobile cache system is particularly suited for wireless application protocol (WAP) services and can be incorporated for use with WAP proxy or Web servers. Caching satisfies user information requests without having to access the origin server, reducing network bandwidth and reducing traffic load on origin servers. Further, by combining caching with dynamic information composition/transformation and providing the option of converting existing HTML applications for use on WAP-enabled services, the inventive mobile cache system can provide personalized WAP service and improved network and server performance at the same time.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system for caching data from an origin server, comprising:
   a wireless device,
   a wireless network,
   a mobile cache that is separated from the wireless device by means of the wireless network, the mobile cache including
      a user profile database that stores at least one user profile containing output preference data with respect to at least one of output content and output layout,
      an object database for storing selected data from the origin server, and
      a dynamic information composer coupled to the object database and the user profile database,
      wherein the dynamic information composer dynamically composes user-specific information as a personalized, user-specific output based on data in the object database and the user profile while simultaneously reducing network traffic; and
   a change trigger coupled to the user profile database and included as part of the mobile cache, the object database, and the dynamic information composer, wherein the change trigger monitors changes in the object database and triggers output delivery when a number of information changes in the object database reaches a predetermined threshold.

2. The system of claim 1, further comprising a user profile generator coupled with the user profile database to generate a new user profile.

3. The system of claim 1, wherein the dynamic information composer composes the user-specific information in WML.

4. The system of claim 3, wherein the dynamic information composer composes the user-specific information in real time.

5. The system of claim 1, further comprising an image converter coupled to the object database for converting an image format of the selected data from the origin server, wherein the object database caches the selected data in the object database after image format conversion.

6. The system of claim 5, further comprising a document converter coupled to the object database for extracting data segments of the selected data from the origin server based on the output preference data, wherein the dynamic information composer composes the user-specific information based on the data segments.

7. The system of claim 6, wherein the document converter converts an HTML file into an XML file and stores the XML file in the object database, and wherein the dynamic information composer composes the user-specific information based on an XML-based content tag in the XML file.

8. The system of claim 1, further comprising a document converter coupled to the object database for extracting data segments of the selected data from the origin server based on the output preference data.

9. The system of claim 8, wherein the document converter converts an HTML file into an XML file and stores the XML file in the object database, and wherein the dynamic information composer composes the user-specific information based on an XML-based content tag in the XML file.

10. A method for caching data from an origin server for delivery to a wireless device by way of a wireless network, comprising the steps of:
   establishing a user profile at a mobile cache separated from the wireless device by way of the wireless network, wherein the user profile contains output preference data with respect to at least one of output content and output layout;
   obtaining an information request;
   storing selected data from the origin server in an object database at the mobile cache;
   fetching requested information from the object database if the object database contains the requested information;
   fetching and caching information from the origin server into the object database as the selected data if the object database does not contain the requested information;

dynamically composing user-specific information and output based on the requested information from the fetching steps and input from the user profile for transmission to the wireless device;

delivering the user-specific information to a wireless device after the composing step;

monitoring, at the mobile cache, a number of information changes in the object database; and triggering the delivery step once the number of information changes in the object database at the mobile cache reaches a predetermined threshold.

11. The method of claim 10, further comprising the step of converting an image format of the selected data from the origin server, wherein the caching step occurs after the image format converting step.

12. The method of claim 11, further comprising the step of converting a document format of the selected data from the origin server, wherein the caching step occurs after the document format converting step.

13. The method of claim 12, wherein the document formatting step includes the steps of extracting at least one data segment of the selected data based on the output preference data such that the composing step composes the user-specific information from said at least one data segment.

14. The method of claim 13, wherein the document formatting step includes the steps of:

converting an HTML file from the origin server to an XML file having an XML-based content tag;

storing the XML file in the object database;

and wherein the composing step composes the user-specific information based on the XML-content tag in the XML file.

15. A system for caching data from an origin server for delivery of updated data, comprising:

a wireless device, a wireless network, and a mobile cache that is separated from the wireless device by means of the wireless network the mobile cache including a user profile database that stores at least one user profile containing output preference data with respect to at least one of output content and output layout, an object database for storing selected data from the origin server, a dynamic information composer coupled to the object database and the user profile database, and a change trigger coupled to the user profile database, the object database, and the dynamic information composer, wherein the dynamic information composer dynamically composes user-specific information as a personalized, user-specific output based on data in the object database and the user profile database while the change trigger monitors changes in the object database and triggers output delivery when a number of information changes in the object database reaches a predetermined threshold.

* * * * *